United States Patent [19]

Maruyama et al.

[11] 4,074,956
[45] Feb. 21, 1978

[54] SULPHUR AND NITROGEN TREATED IRON BASED ROTOR FOR ROTARY PISTON ENGINE

[75] Inventors: Masayuki Maruyama, Kashiwazaki; Yoshitugu Hamada; Ryoichi Yamauchi, both of Nagahama, all of Japan

[73] Assignee: Riken Piston Ring Kogyo Kabushiki Kaisha, Tokyo, Japan

[21] Appl. No.: 694,450

[22] Filed: June 9, 1976

[30] Foreign Application Priority Data

Nov. 29, 1975 Japan .................................. 50-142629

[51] Int. Cl.² .................................................. F01C 21/00
[52] U.S. Cl. ........................................... 418/178; 418/179
[58] Field of Search ........................... 418/178, 179; 123/193 C; 417/DIG. 1; 308/DIG. 8, 241; 148/16.6, 31.5; 75/143

[56] References Cited

U.S. PATENT DOCUMENTS

| 2,707,159 | 4/1955 | Foucry et al. ................... 148/6.11 |
| 3,197,125 | 7/1965 | Bachman et al. ............... 418/179 X |
| 3,333,579 | 8/1967 | Shockley et al. ................ 308/241 X |
| 3,359,956 | 12/1967 | Bentele ............................ 418/179 X |
| 3,712,767 | 1/1973 | Beutter ............................ 418/179 X |
| 3,808,955 | 5/1974 | Hamada et al. ................. 418/178 X |
| 3,903,951 | 9/1975 | Kaweko et al. ............. 123/193 C X |

FOREIGN PATENT DOCUMENTS

| 2,034,896 | 2/1971 | Germany ............................. 418/178 |
| 640,536 | 7/1950 | United Kingdom ................ 148/6.11 |

*Primary Examiner*—William L. Freeh
*Assistant Examiner*—Leonard Smith
*Attorney, Agent, or Firm*—Finnegan, Henderson, Farabow & Garrett

[57] ABSTRACT

A rotary piston engine has a pair of side housings made of high silicon aluminum alloy and a rotor made of iron-based material. The side surfaces of the rotor are subjected to a surface treatment called "Sulfinuz" to form surface layers rich in sulphur and nitrogen for minimizing scuffing between the side surfaces of the side housings and the side surfaces of the rotating rotor due to thermal expansion of the side housings and vibration of the rotor.

6 Claims, 6 Drawing Figures

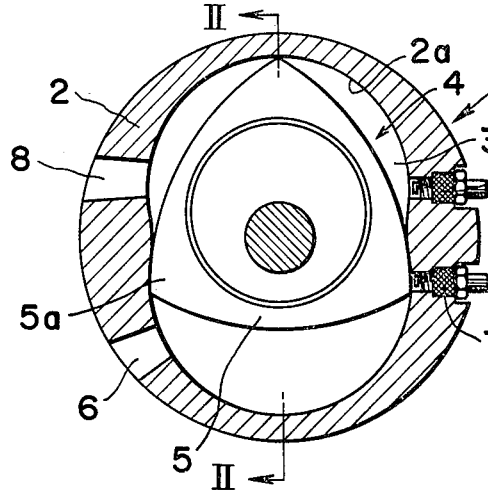
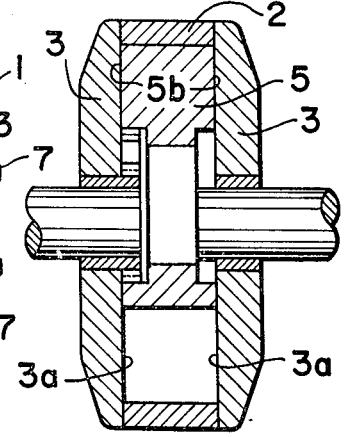
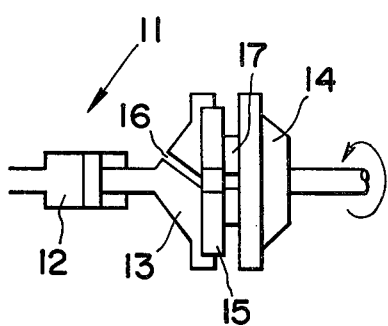
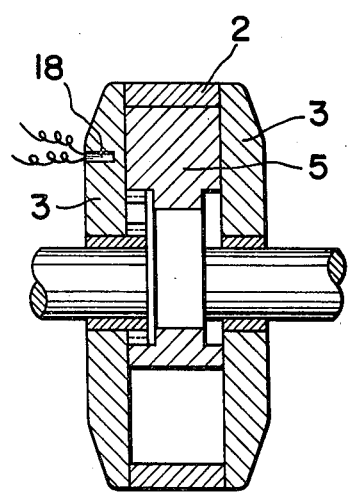
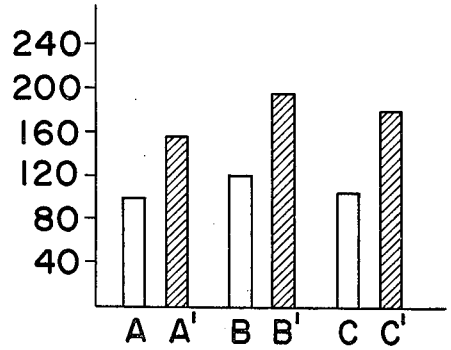
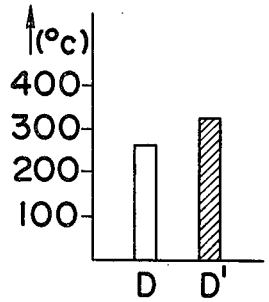

SULPHUR AND NITROGEN TREATED IRON BASED ROTOR FOR ROTARY PISTON ENGINE

The present invention relates to rotary piston engines and more particularly to rotary piston engines having a pair of side housings of aluminum based alloy and a rotor of iron based material.

Conventional rotary piston engines comprise a casing including a rotor housing having an inner wall surface of multiple-lobed trochoidal configuration and a pair of side housings attached to the opposite sides of the rotor housing to define therein a rotor cavity of multiple-lobed trochoidal configuration, and a substantially polygonal rotor disposed in said rotor cavity for rotation and revolution with apex portions in sliding contact with the inner surface of the rotor housing. In this type of engines, it has been experienced that scuffing is produced between the side surfaces of the rotor and the adjacent surfaces of the side housing due to the thermal expansion of the side housings and the vibration of the rotor when the engine is being operated under a high temperature. The phenomenon of scuffing is considered as being produced under an increased engine temperature, an increased contact pressure between co-operating sliding surfaces and an increased sliding speed between the surfaces.

Through recent development of rotary piston engines, it has been proposed to employ high silicon aluminum alloy for casing material for the purpose of decreasing the weight of the casing and attain an increased air-cooling effect. From the viewpoint of heat and wear resistant property, the aluminum alloy casing material usually include 14 to 20 percent of silicon. It has been found that, when the housing of high silicon aluminum alloy is used in combination with a rotor of iron based material, the aforementined scuffing is apt to be produced resulting in a decrease in engine performance. Thus, hithertofore, it has not been possible to fully and effectively utilize the merits of the high silicon aluminum alloy casing.

It is therefore an object of the present invention to minimize scuffing between a housing and a rotor of a rotary piston engine.

Another object of the present invention is to provide rotary piston engines comprising a housing of high silicon aluminum alloy and a rotor of iron based material, in which surface treatment is made on the side surfaces of the rotor so that scuffing between the housing and the rotor can be minimized.

According to the present invention, the above and other objects can be accomplished by a rotary piston engine comprising a casing which includes a center housing and a pair of side housings secured to the opposite sides of the center housing, and a rotor disposed in said casing for rotation, said side housings being made of high silicon aluminum alloy, said rotor being made of iron based material and having opposite side surfaces which are arranged to face to inside surfaces of the side housings of the casing, the side surfaces of the rotor being subjected to surface treatment to form surface layers rich in sulphur and nitrogen.

The above and other objects and features of the present invention will become apparent from the following descriptions of preferred embodiment taking reference to the accompanying drawings, in which;

FIG. 1 is a sectional view of a rotary piston engine in which the present invention is embodied;

FIG. 2 is a sectional view taken substantially along the line II—II in FIG. 1;

FIG. 3 is a sectional view of a scuff resistant property testing machine;

FIG. 4 is a diagram showing the effects of scuffing resistant property on a combination of materials for use in the rotor and the housings in accordance with the present invention;

FIG. 5 is a sectional view of a rotary piston engine having temperature sensing bulb enbedded in the casing for measuring the engine temperature; and, FIG. 6 is a diagram showing the scuff resistant property as measured in terms of the engine temperature at which the scuff occurs.

Referring now to the drawings, particularly to FIGS. 1 and 2, there is shown a rotary piston engine in which the present invention can be embodied. The engine comprises a casing 1 which includes a center housing 2 having an inner wall surface 2a of two-lobed trochoidal configuration and a pair of side housings 3 secured to the opposite sides of the center housing 2 to define a rotor cavity 4 therein. A substantially triangular rotor 5 is disposed in the rotor cavity 4 with apex portions 5a in sliding contact with the inner wall 2a of the center housing 2. The center housing 2 is formed with an exhaust port 6 and two ignition plugs 7. Intake port 8 is formed either or both of the center and side housings 2 and 3.

The side housings 3 are made of high silicon aluminum alloy and the rotor 5 is made of iron based material. In this type of rotary piston engine, it has been experienced that the side surfaces 5a of the rotor 5 and the side surfaces 3a of the side housings 3 are subjected to scuffing problems previously described when the engine is operated under a high temperature.

According to the present invention, in order to eliminate the scuffing problem, the Sulfinuz treatment (see Gregory, *A Salt Bath Treatment to Improve the Resistance of Ferrous Metals to Scuffing, Wear, Fretting, and Fatigue,* 9 Wear 249 (1966)) is supplied to at least the side surfaces of the rotor for forming surface layers rich in sulphur and nitrogen. The Sulfiniz treatment may be performed by dipping the rotor of iron based material into a salt bath containing 46.5 weight percent of NaCN, 31 weight percent of $Na_2CO_3$, 12.5 weight percent of NaCl and 10 weight percent of $Na_2S_2O_3.5H_2O$ at a temperature of 570° ± 5° C for about three hours, and then cooling the rotor in a diluted water solution of KCl or NaCl. Thereafter, the rotor may be subjected to conventional corrosion resistant treatment. Through said Sulfinuz surface treatment, sulphur and nitrogen atoms are impregnated into the side surfaces of the rotor and the surface layers rich in sulphur and nitrogen are formed.

In order to realize the effect of the surface treatment on the scuff-resistant property, tests have been made by using a scuff testing machine 11 as shown in FIG. 3. The machine 11 includes a stationary disc 13 which is connected with a hydraulic piston-cylinder device 12 and a rotatable disc 14 which can be rotated as shown by an arrow in FIG. 3, by means of an appropriate power source (not shown). The stationary disc 13 is adapted to hold a plate 15 made of high silicon aluminum alloy. The rotatable disc 14 is adapted to hold a rotor or test piece 17 of iron based material. Hydraulic pressure is applied to the piston-cylinder device 12 so that the plate 15 is in pressure contact with the rotatable test piece 17 supported on the rotatable disc 14. Then, the disc 14 and the test piece 17 are driven with lubricant oil appropriately supplied through an oil passage 16 formed in the stationary disc 13 to the interface between the plate 15 and the test piece 17. The rotating speed of the test piece 17 has been so controlled that the relative sliding speed between the test piece 17 and the plate 15 is approximately 8m/sec. The hydraulic pressure in the piston-cylinder device 12 has been increased step by step until scuffing is observed. At each step, the test has been continued for three minutes. The plate 15 was a circular disc which was 80mm in diameter and 10mm in thickness. The test piece 17 was 5mm in length, 5mm in width and 8mm in thickness.

Tests have been made on iron based alloy cast iron with and without surface treatment, cast iron for piston ring with and without surface treatment, and ductile cast iron with and without surface treatment. The treatment has been performed under bath temperature of 570° C for 3 hours. The stationary plate 17 has been made by aluminum based alloy containing 16 percent of silicon. The tests results are shown in FIG. 4 wherein A shows the test result for the iron based alloy cast iron without surface treatment, A' for the iron based alloy cast iron with such treatment, B for the cast iron for piston ring without such treatment, B' for the cast iron with such treatment, C for the ductile cast iron without such treatment and C' for the ductile cast iron with such treatment.

In FIG. 4, it will be noted that the surface treatment on the iron based material is effective to provide a remarkable improvement on the scuff-resistant property of the material when it is used with a high silicon aluminum alloy.

Air cooled rotary piston-engines have been provided with the center housing 2 made of aluminum based alloy containing 11 percent of silicon and having a chromium-plated inner surface, the side housings 3 made of aluminum based alloy containing 16 percent of silicon and the rotors 5 made of ductile cast iron with and without the sulfonitriding treatment. The side housings 3 are provided with temperature sensitive bulb 18 such as thermocouples as shown in FIG. 5. The engines have been operated at normal operating speed such as 7000rpm so that the engine temperature is increased and stabilized. Then, the engine operating condition is so controlled that the engine temperature is abnormally increased for example by changing the air-fuel ratio of the combustible mixture supplied to the engines. Scuff-resistant properties have been represented in terms of engine temperature at which the temperature suddenly increases.

The test results are shown in FIG. 6. In this figure, D shows the test result for the ductile iron rotor without sulfonitriding treatment while D' for the ductile iron motor with such treatment. It will be seen that, in an engine having a rotor with the sulfonitriding treatment, scuff-resistant property has been significantly improved as compared with that in an engine having a rotor without such treatment.

The invention has thus been shown and described with reference to specific embodiment, however, it should be noted that the invention is in no way limited to the details of the illustrated embodiment but changes and modifications may be made without departing from the scope of the appended claims.

We claim:

1. A rotary piston engine comprising a casing which includes a center housing and a pair of side housings secured to the opposite sides of the center housing, and a rotor disposed in said casing for rotation, said side housings being made of high silicon aluminum alloy, said rotor being made of iron based material and having opposite side surfaces which are arranged to face the inside surfaces of the side housings, said rotor having surface layers rich in sulphur and nitrogen on the side surfaces thereof.

2. A rotary piston engine in accordance with claim 1 in which said side housings are made of aluminum based alloy containing 14 to 20 percent of silicon.

3. A rotary piston engine in accordance with claim 2 in which said side housings are made of aluminum based alloy containing approximately 16 percent of silicon.

4. A rotary piston engine in accordance with claim 1 in which said rotor is made of iron based alloy cast iron.

5. A rotary piston engine in accordance with claim 1 in which said rotor is made of cast iron.

6. A rotary piston engine in accordance with claim 1 in which said rotor is made of ductile cast iron.

* * * * *